United States Patent [19]

Yoshioka et al.

[11] Patent Number: 5,072,813
[45] Date of Patent: Dec. 17, 1991

[54] DAMPER

[75] Inventors: Yuji Yoshioka; Yukio Yamamoto, both of Susono; Osamu Ogawa, Mishima; Fujio Nakayama; Tomoki Hitani, both of Susono; Ryuichi Kurosawa, Numazu, all of Japan

[73] Assignee: Toyota Jidosha Kabushiki Kaisha, Toyota, Japan

[21] Appl. No.: 480,619

[22] Filed: Feb. 15, 1990

[30] Foreign Application Priority Data

Feb. 16, 1989 [JP] Japan .................................. 1-34887

[51] Int. Cl.⁵ .............................................. F16F 09/34
[52] U.S. Cl. ........................... 188/322.15; 188/322.14
[58] Field of Search ........... 188/282, 317, 318, 322.13, 188/322.14, 322.15, 280, 281, 322.22, 380

[56] References Cited

U.S. PATENT DOCUMENTS 4,492,290  1/1985  Zavodny ..................... 188/322.14

FOREIGN PATENT DOCUMENTS 18-17469  7/1943  Japan .
62-43805  3/1987  Japan .

Primary Examiner—Robert J. Oberleitner
Assistant Examiner—Alfred Muratori
Attorney, Agent, or Firm—Cushman, Darby & Cushman

[57] ABSTRACT

A damper includes a cylinder, a partition member for partitioning the interior of the cylinder into two liquid chambers, an orifice for generating a damping force by flow of liquid, and a bypass path affording communication between the two liquid chambers. The damper further includes a mass body attached to the partition member that is movable in an axial direction of the cylinder and biased to close the bypass path. The speed of the mass body when opening the bypass path is faster than the speed of the mass body when closing the bypass path.

7 Claims, 5 Drawing Sheets ial liquid chamber formed in an intermediate portion
DAMPER

BACKGROUND OF THE INVENTION

1. Field of the Invention

This invention relates to a damper and, more particularly, to a damper suitably used as a shock absorber provided on a suspension of a vehicle.

2. Description of the Prior Art

A shock absorber utilizing inertia and tending to hold a damping force small when high frequency vibrations are input from a tire while tending to increase the damping force when low frequency vibrations are input from the tire has been proposed (Japanese Utility Model Public Disclosure (KOKAI) No. 62-43805). This shock absorber includes a partition member for partitioning the interior of a cylinder into two liquid chambers, a path provided in the partition member and affording communication between both liquid chambers, an auxiliary liquid chamber formed in an intermediate portion of the path, and a valve body serving as a mass body and vertically movably disposed in the auxiliary liquid chamber.

The valve body is provided on a shoulder with an orifice and a damping force is generated by liquid flowing through the orifice. When a relative displacement takes place between the partition member and the valve body, the flow area of the orifice is varied. Thus, the magnitude of the damping force is adjustable.

Another damping device utilizing inertia has also been proposed (Japanese Utility Model Publication No. 43-17469). According to this damping device, a bypass path provided in a piston rod affords communication between two liquid chambers, which are partitioned by a piston, inside a cylinder, while a mass body is movably disposed in an opening end of the bypass path.

When a relative displacement takes place between the piston rod and the mass body, the flow area of the mass body communicating to the bypass path is varied to vary the quantity of liquid flowing in the bypass path.

In the shock absorber disclosed in the former Public Disclosure, since the valve body moves vertically in the auxiliary liquid chamber, an internal path of a small bore is provided in the valve body itself in order to ensure the movement of the valve body. Thus, when the relative displacement takes place between the valve body and the partition member, liquid passes through the internal path to generate a delay in the movement of the valve body due to the resistance at the time of passage of the liquid. This is only because the function of changing the damping force is not sufficiently fulfilled particularly when the high frequency vibrations are input.

In the damping device disclosed in the latter publication, the mass body moves under the condition that the mass body substantially receives no resistance. Accordingly, the mass body sufficiently relatively moves to vary immediately the area of the bypass path when an external force is exerted to bring about the relative displacement between the piston rod and the mass body. However, since the mass body biased toward the neutral position by the action of a coiled spring, the mass body is moved quickly in a direction of hindering the variation of the area of the bypass path by the action of the coiled spring. This means that the change-over of the damping force frequently occurs to bring about the generation of an impact force.

SUMMARY OF THE INVENTION

An object of the present invention is to provide a damper capable of reducing sufficiently a damping force for the input vibration having large compressive acceleration.

A damper according to the present invention comprises a cylinder, a partition member for partitioning the interior of the cylinder into two liquid chambers, and including means for generating a damping force by flow of liquid directing from one liquid chamber to the other liquid chamber and a bypass path affording communication between the two liquid chambers without passing through the damping force generating means, a mass body attached to the partition member to be movable in an axial direction of the cylinder and biased such as to close the bypass path, and means for making the speed of the mass body when opening the bypass path faster than the speed of the mass body when closing the bypass path when a relative displacement takes place between the mass body and the partition member.

When the damper is of a so-called twin cylinder type, which is provided with an inside cylinder and an outside cylinder spaced apart from the inside cylinder, the partition member is disposed at a distance from a piston on the bottom of the inside cylinder.

When the damper is of a so-called mono tube gas filled type, which includes a single cylinder, a piston connected to a piston rod and a free piston respectively disposed slidably in the cylinder, the piston serves as the partition member.

In a preferred embodiment, the means for generating the damping force in the contraction of the piston rod is provided on the partition member. This damping force generating means is usually an orifice. In this embodiment, the mass body itself is provided with a path or the orifice, and a free valve is disposed on the upside of the path or orifice. When the mass body closes the bypass path, an auxiliary liquid chamber is defined below the path or orifice of the mass body. The relative speed of the mass body when opening the bypass path as compared to the speed of the mass body when closing the bypass path are varied by the path or orifice of the mass body, the free valve and the auxiliary liquid chamber.

The damper is used to be installed on a suspension of a vehicle, for example. Then, the damper is mounted so as to damp an impact in the contraction of the piston rod.

When an impact thrusting up a vehicle body from a road surface, i.e., impact for contracting the piston rod is exerted, the partition member is accelerated and moved upward. At this time, since the mass body is not moved by its inertia, the mass body comes to such a condition that the mass body is moved downward relative to the partition member to open the bypass path. When the bypass path is opened, the quantity of liquid passing through the damping force generating means is reduced to lessen the damping force generated.

When the tire runs over a projection on the road surface, the partition member is moved downward and the mass body is moved upward relative to the downward movement of the partition member. The upward movement of the mass body at this time is gentle.

When the input acceleration is small like that in rolling at the turning of a vehicle, the relative movement does not take place between the partition member and the mass body. Thus, the bypass path is closed, so that a great quantity of liquid passes through the damping force generating means. Accordingly, a large damping force is generated.

When the damper is mounted on the suspension of the vehicle and the input acceleration in the contraction of the piston rod exceeds a predetermined value, the mass body is moved relative to the partition member to open the bypass path, so that the damping force is reduced. As a result, the impacts transmitted to the vehicle body are substantially eliminated.

Since the relative speed of the mass body when closing the bypass path is restrained, even if the mass body opens the bypass path in response to the acceleration exceeding the predetermined value and thereafter the acceleration is reduced, the bypass path maintains the opened condition for a certain period of time. Thus, even if the acceleration of the input vibration is frequently varied, the change-over of the damping force does not frequently take place, so that the degradation of riding comfort is restrained.

BRIEF DESCRIPTION OF THE DRAWINGS

The foregoing and other objects and features of the invention will become apparent from the following description of preferred embodiments of the invention with reference to the accompanying drawings, in which:

FIGS. 4a and 4b show the calculation result of simulation respectively, in which FIG. 4a shows a sprung acceleration and FIG. 4b shows the opening of a bypass path and in each figure the left side numerical values of the vertical line correspond to the ratio to the right side numerical value.

DETAILED DESCRIPTION OF PREFERRED EMBODIMENTS

Figure 1:
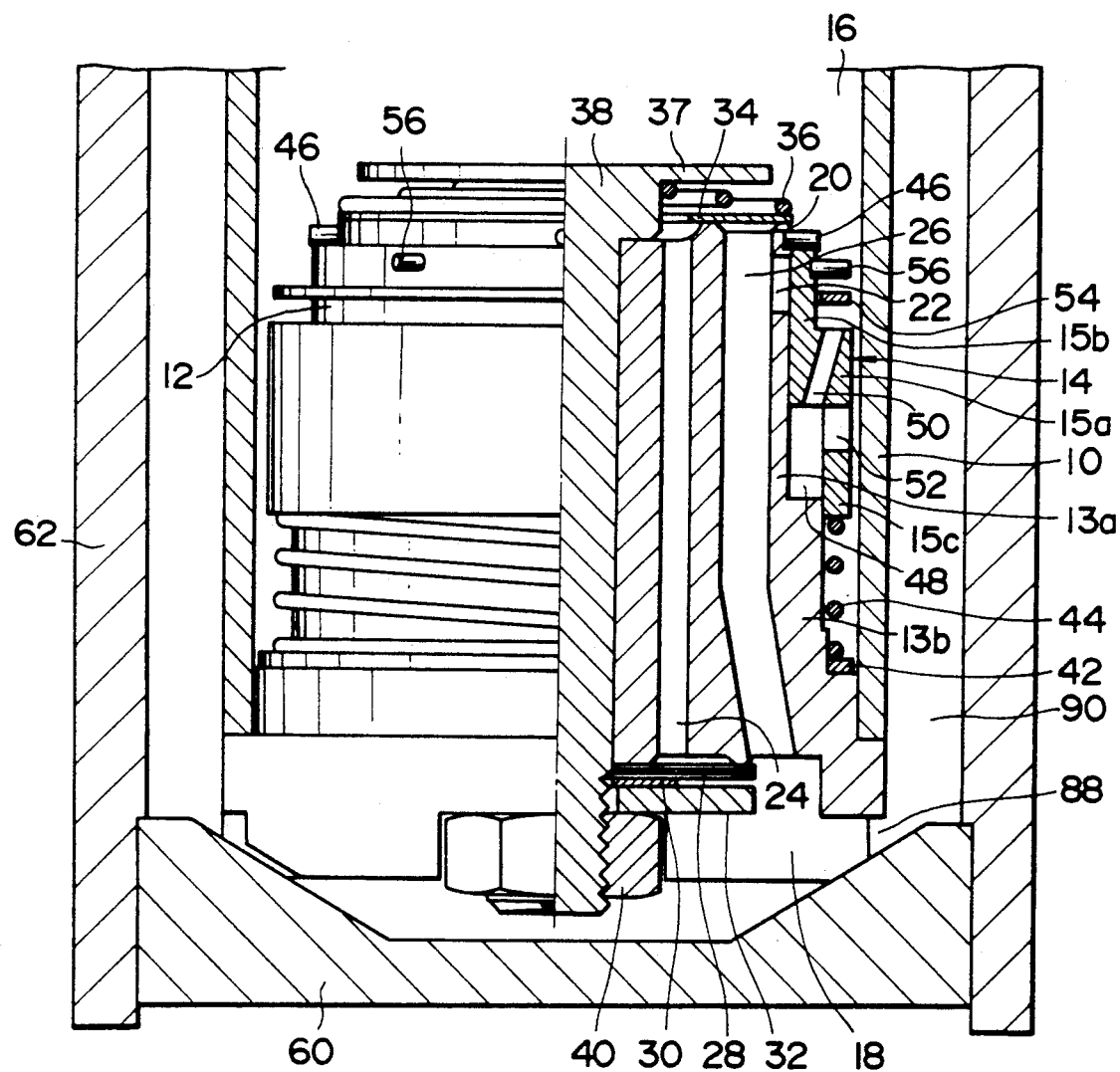
FIG. 1 is a sectional view showing principal portions of a damper according to the present invention, in which the left side of a partition member is shown in a non-section.

As shown in FIG. 1, a damper comprises a cylinder 10, a partition member 12 and a mass body 14.

The partition member 12 is disposed on the bottom of the cylinder 10 to partition the interior of the cylinder 10 into two liquid chambers 16, 18 and is provided with damping force generating means 20 and a bypass path 22.

The partition member 12 is provided with a plurality of ports 24 and a plurality of ports 26 at circumferential intervals. A valve body 28 formed of a leaf spring, a spacer 30 and a stopper 32 are disposed at the underside of the ports 24. On the other hand, a valve body 34 is disposed at the upside of the ports 26 and is biased toward the partition member 12 by the action of a coiled spring 36. A valve guide 38 having a stopper 37 is inserted into the partition member 12. The valve body 28, the spacer 30 and the stopper 32 are inserted in the mentioned order into a portion of the valve guide projecting from the partition member 23 to be attached to the partition member 12 by screwing a nut 40 onto the portion.

The damping force generating means 20 in the embodiment shown is an orifice 20 formed in a portion of the partition member which is in contact with the valve body 34. The orifice 20 affords communication between the liquid chamber 16 and the port 26 to generate a damping force by flow of liquid directing from the liquid chamber 16 to the liquid chamber 18.

The bypass path 22 affords communication between the liquid chambers 16, 18 without passing through the damping force generating means 20. In the embodiment shown, the bypass path 22 opens to the liquid chamber 16 and communicates to the port 26 to form a path communicating to the liquid chamber 18 in cooperation with the port 26.

The mass body 14 is attached to the partition member 12 so as to be movable in an axial direction of the cylinder 10 and is biased so as to close the bypass path 22. In the embodiment shown, the mass body 14 is provided as one body with an annular support portion 15a, a cylindrical enclosure portion 15b projecting upward from an inner periphery of the support portion 15a, and a cylindrical enclosure portion 15c projecting downward from an outer periphery of the support portion 15a.

The mass body 14 has a bore dimensioned such that the support portion 15a and the enclosure portion 15b are movably inserted onto a small diameter portion 13a of the partition member 12, and the enclosure portion 15c is movably inserted onto a large diameter portion 13b of the partition member. The whole mass of the mass body 14 is determined in consideration of the magnitude of acceleration to which the mass body responds.

A spacer 42, a coiled spring 44 and the mass body 14, respectively, are inserted onto the partition member 12, and a plurality of pins 46 are driven into the partition member 12 to mount the mass body 14 to the partition member 12. The mass body 14 is biased toward the pins 46 by the coiled spring 44 and closes the bypass path 22 under the biased condition.

The damper further comprises means for increasing the speed of the mass body 14 when opening the bypass path, 22 beyond the speed when closing the bypass path 22 when the relative displacement takes occurs between the mass body 14 and the partition member 12.

In the embodiment shown, an auxiliary liquid chamber 48 is defined by the support portion 15a and the enclosure portion 15c of the mass body 14 and two portions 13a, 13b of the partition member 12 when the mass body 14 is biased to close the bypass path 22. Paths 50, 52 are provided respectively in the support portion 15a and the enclosure portion 15c of the mass body 14. An annular free valve 54 is disposed on the upside of the path 50. The extent of movement of the free valve 54 is regulated by a plurality of stopper pins 56. The means for making the speed of the mass body when opening the bypass path faster than the speed of the mass body when closing the bypass path consists of the auxiliary liquid chamber 48, the paths 50, 52 and the free valve 54.

The cylinder 10 is fitted to the partition member 12, and the partition member 12 is disposed on a base cap 60. The base cap 60 is welded to an outside cylinder 62 disposed at a distance from the cylinder 10.

Figure 2:
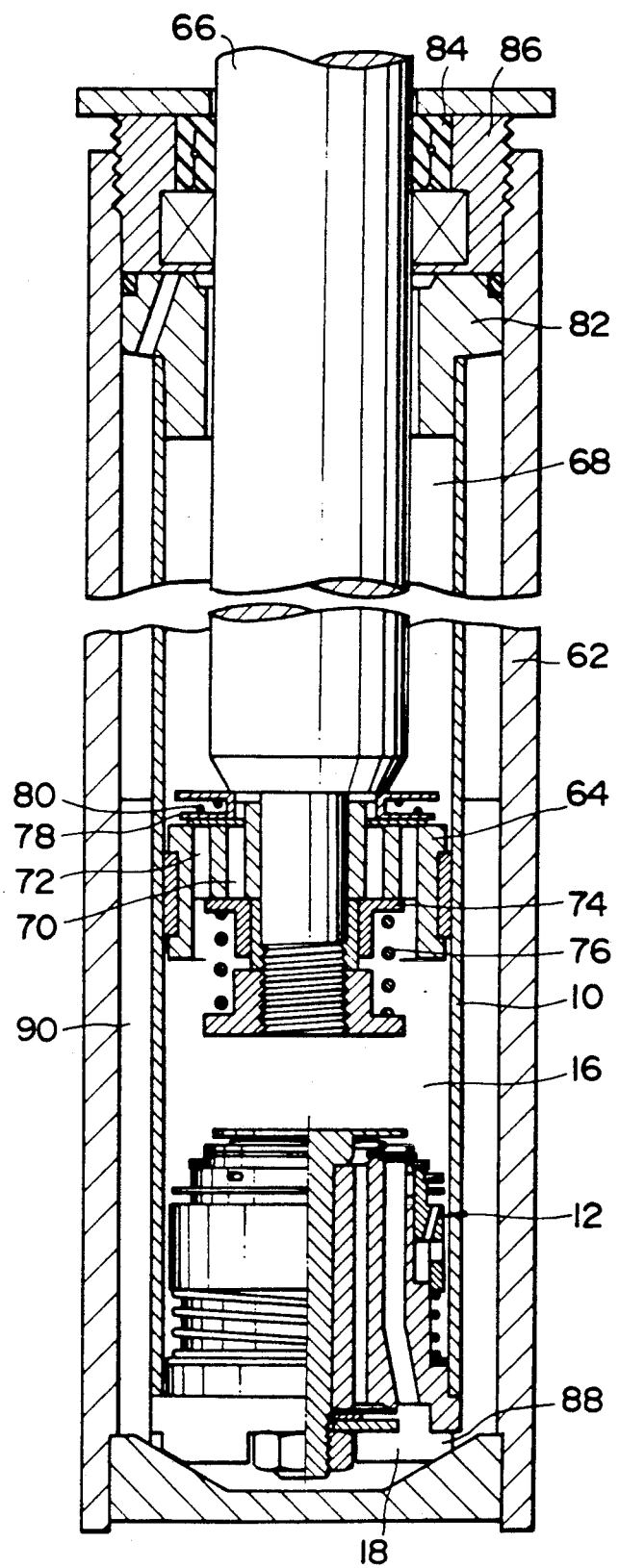
FIG. 2 is a sectional view showing an embodiment of the damper according to the present invention.

As shown in FIG. 2, a piston 64 connected to a piston rod 66 is disposed slidably in the cylinder 10 to partition the interior of the cylinder into two liquid chambers 16, 68. The piston 64 has a plurality of parts 70 and a plurality of parts 72. A valve body 74 and a coiled spring 76 are provided in association with the ports 70, and a valve body 78 and a coiled spring 80 are provided in association with the ports 72. The composition of the piston 64 as noted above is well known.

A rod guide 82 is disposed on the upper ends of the cylinders 10, 62 and a cap 86 having an oil seal 84 is screwed into the cylinder 62. The liquid chamber 18 located beneath the partition member 12 communicates with a gap 90 between both the cylinders 10, 62 through a path 88. The gap 90 serves as a reservoir chamber for use of the liquid. The liquid chamber 18 and a lower portion of the reservoir chamber 90 are filled with oil or other liquid and an upper portion of the reservoir chamber 90 is filled with air or other gas to constitute the damper.

Figure 3:
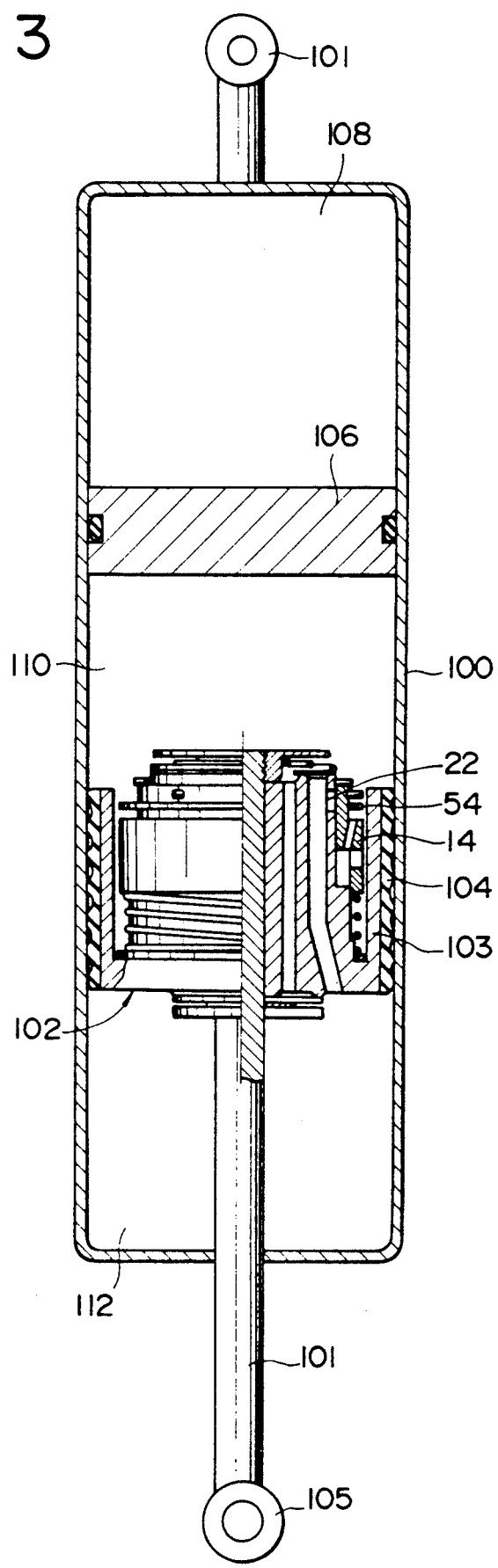
FIG. 3 is a sectional view showing another embodiment of the damper according to the present invention.

FIG. 3 shows a mono tube gas filled type damper. A piston 102 disposed slidably in a cylinder 100 and connected to a piston rod 101 is provided with a skirt 103, and a seal band 104 is attached to the outer peripheral surface of the skirt 103. The mass body 14 and the bypass path 22, etc. are provided radially inward of the skirt 103. Since the composition of each of these parts is substantially similar to that of the partition member as described above, the corresponding parts having the same functions are designated by the same reference numbers and the description thereof is omitted.

A free piston 106 is disposed at a distance from and above the piston 102, and a gas chamber 108 is defined above the free piston 106. Two liquid chambers 110, 112 partitioned by the piston 102 are filled with oil or other liquid, and the gas chamber 108 is filled with high pressure gas.

In the damper shown in FIGS. 1 and 2, the cylinder 62 is connected to a suspension arm to be used with the upper end of the piston rod 66 being connected to a vehicle body. On the other hand, in the damper shown in FIG. 3, an eye 105 of the piston rod 104 and an eye 101 of the cylinder 100 are respectively connected to the suspension arm and the vehicle body for use.

Hereinafter will be described the operation of the damper. Since the operation of the damper shown in FIG. 3 is similar to that shown in FIG. 1, it will be described with respect to that shown in FIG. 1.

When impacts are exerted upon a vehicle body from a road surface, the damper is contracted. Large impacts abruptly accelerate and move up the partition member 12 integral with the cylinder 62. Since the mass body 14 is not moved by its inertia, relative movement takes place between the mass body 14 and the partition member 12. This means that the mass body 14 is moved downward relative to the partition member 12, according to this relative movement between the mass body 14 and the partition member 12 to open the bypass path 22. The downward movement of the mass body 14 at this time is facilitated by the paths 50, 52 provided in the mass body 14.

While the liquid paths in the initial stage, when the damper is contracted, are the orifice 20 of the damping force generating means and the port 26, a large damping force is usually generated in the initial stage since the flow area of the orifice 20 is small. However, the bypass path 22 is opened according to the impact force, so that the path of liquid is divided into two systems according to the present invention; that is, one from the orifice 20 to the port 26, and the other from the bypass path 22 to the port 26. Thus, when the flow area of the bypass path 22 is expanded, the damping force caused by the liquid flowing through the orifice 20 is reduced considerably.

When the mass body 14 is moved downward relative to the partition member 12, the free valve 54 is moved upward by the liquid flowing out of the path 50 to open the path 50. Thus, the liquid in the auxiliary liquid chamber 48 easily flows out through the path 50. Thus, when the impact force is exerted from the road surface, the mass body 14 moves downward relative to the partition member 12.

When the mass body 14 is moved upward relative to the partition member 12, the free valve 54 closes the path 50 with the force of the liquid tending to flow into the path 50. Thus, the inflow of the liquid into the auxiliary liquid chamber 48 is limited only to that from the path 52, and the inflow of the liquid into the auxiliary liquid chamber 48 takes a lot of time. That is, after the impact force is reduced or lost, the mass body 14 tends to move upward relative to the partition member 12 by the action of the coiled spring 44, while the speed of the relative movement between the mass body 14 and the partition member 12 is restrained.

Figure 4A:
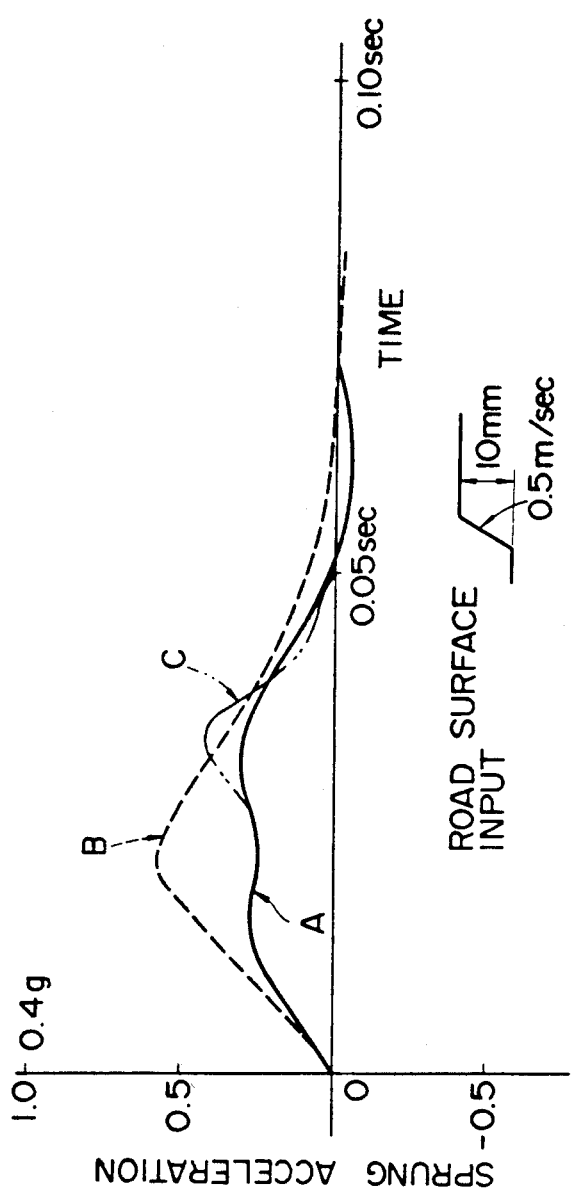
Figure 4B:
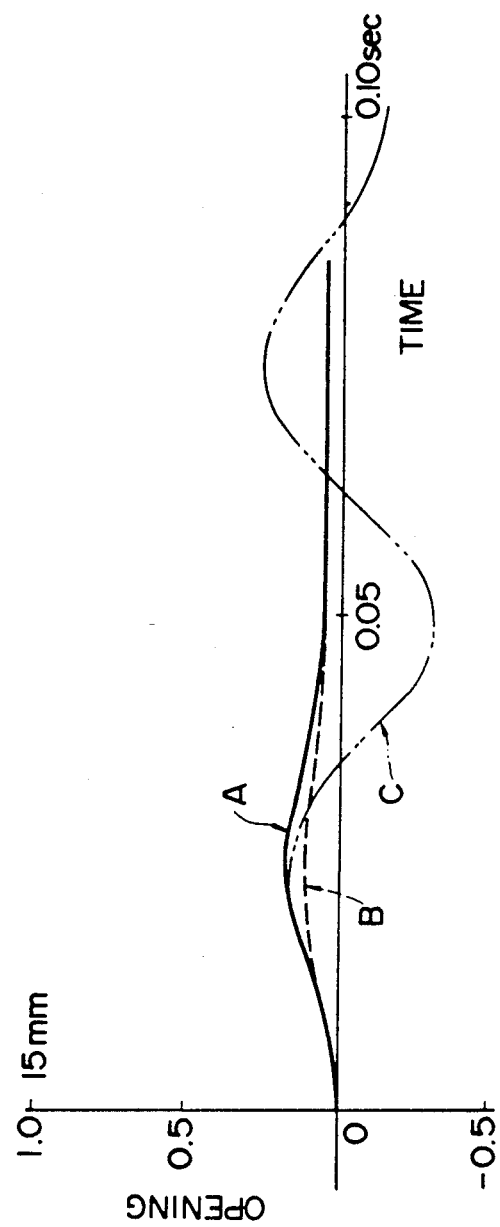
Figure 5:
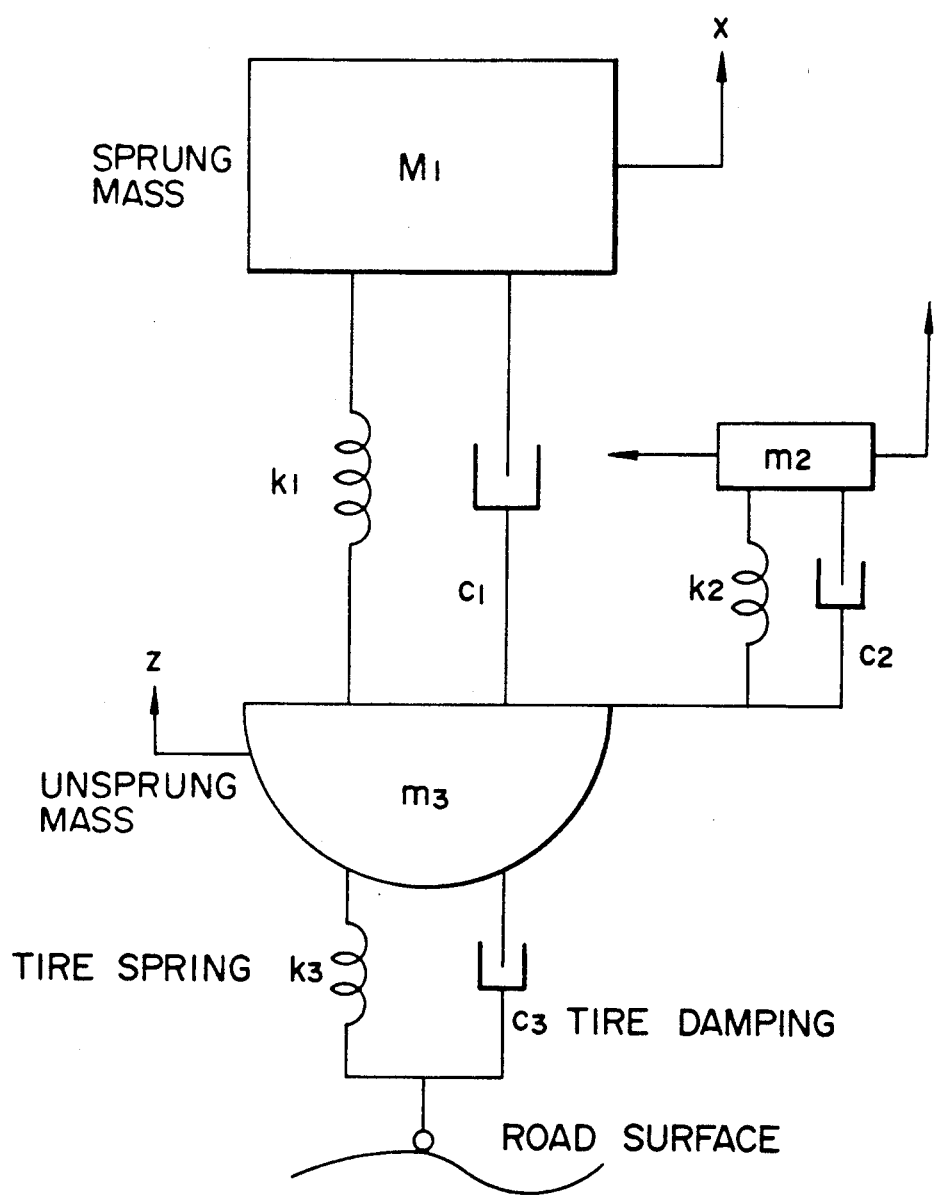
FIG. 5 is a diagram showing a model of a vibration system used for the simulation calculation.

FIGS. 4a, 4b show the relationship between the opening of the bypass path and the sprung acceleration obtained from a simulation calculation using the model of a vibration system as shown in FIG. 5 and the dimensions in the following table, in which A represents the relationship according to the present invention, B represents the relationship according to Japanese Utility Model Public Disclosure (KOKAI) No. 62-43805, and C represents the relationship according to Japanese Patent Publication No 43-17469. Further, the road surface input is equivalent to the magnitude for a vehicle to ride on 10 mm of height with 0.5 m/sec.

FIG. 4a shows that overall, the sprung acceleration is low according to the present invention. Also, it is noted from FIG. 4b that the opening time of the bypass path is long.

| Dimensions | |
| --- | --- |
| Sprung mass | $M_1$: 350 kg |
| Unsprung mass | $m_3$: 20 kg |
| Spring constant of vehicle | $K_1$: 15000 N/m |
| vehicle damper | $C_1$: 40 kg (contraction) |
| | 70 kg (expansion) |
| | (at a time of 0.3 m/sec) |
| Tire spring constant | $K_3$: 150,000 N/m |
| Tire damping | $C_3$: 500 Ns/m |
| Weight mass | $m_2$: 41 g |
| Weight damping | $C_2$: as shown on the following table |

| | Damping force in upward movement in FIG. 1 (Ns/m) | Damping force in downward movement in FIG. 1 (Ns/m) |
| --- | --- | --- |
| A | 31.2 | 1.0 |
| B | 16.1 | 16.1 |
| C | 1.0 | 1.0 |

What is claimed is:

1. A damper comprising:
   a cylinder;
   a partition member for partitioning the interior of the cylinder into a first liquid chamber and a second liquid chamber, and including:
   means for generating a damping force by the flow of liquid from said first liquid chamber to said second liquid chamber; and
   a bypass path for communicating between said first and second liquid chambers without passing through said damping force generating means;
   a mass body attached to said partition member for moving relative to said partition member in an axial direction of said cylinder and for opening and closing said bypass path; and means for making the speed of said mass body when opening said bypass path faster than the speed of said mass body when closing said bypass path in response to a relative displacement between said mass body and said partition member, a relative speed difference between said mass body when opening said bypass path and said mass body when closing said bypass path being generated by a difference in flow resistance imparted against the motion of said mass body as said mass body moves to open and to close said bypass path.

2. A damper as claimed in claim 1, further comprising a piston disposed slidably in said cylinder and connected to a piston rod and an outside cylinder spaced apart from the cylinder, and wherein said partition member is disposed at a distance from the piston on the bottom of said cylinder.

3. A damper as claimed in claim 2, wherein said damping force generating means generates the damping force in the contraction of the piston rod.

4. A damper as claimed in claim 1, wherein said partition member is disposed slidably in the cylinder as a piston.

5. A damper as claimed in claim 1, wherein said damping force generating means comprises at least one orifice provided in said partition member.

6. A damper comprising:

a cylinder;

a partition member for partitioning the interior of the cylinder into a first liquid chamber and a second liquid chamber, and including:

means for generating a damping force by the flow of liquid from said first liquid chamber to said second liquid chamber; and a bypass path for communicating between said first and second liquid chambers without passing through said damping force generating means;

a mass body attached to said partition member for moving relative to said partition member in an axial direction of said cylinder and for opening and closing said bypass path;

means for making the speed of said mass body when opening said bypass path faster than the speed of said mass body when closing said bypass path in response to a relative displacement between said mass body and said partition member, a relative speed difference between said mass body when opening said bypass path and said mass body when closing said bypass path being generated by a difference in flow resistance imparted against the motion of said mass body as said mass body moves to open and to close said bypass path; and a free valve for opening and closing said bypass path disposed movably in the axial direction of said cylinder, and wherein:

an auxiliary liquid chamber is defined by said partition member and said mass body, and said bypass path is provided in said mass body for communicating to said auxiliary liquid chamber; and said means for making the speed of said mass body faster includes: said free valve, said bypass path and said auxiliary liquid chamber.

7. A damper as claimed in claim 6, wherein said mass body comprises at least one additional path for communicating with one of either said first or second liquid chambers.

* * * * *